United States Patent [19]

Kiilunen

[11] Patent Number: 4,673,796
[45] Date of Patent: Jun. 16, 1987

[54] ARC WELDING ELECTRODE

[75] Inventor: Matt Kiilunen, Brighton, Mich.

[73] Assignee: Weld Mold Company, Brighton, Mich.

[21] Appl. No.: 806,532

[22] Filed: Dec. 9, 1985

[51] Int. Cl.$^4$ ............................................. B23K 35/02
[52] U.S. Cl. ........................... 219/145.22; 219/145.23; 219/145.1
[58] Field of Search ................. 219/145.23, 145.1, 75, 219/145.22

[56] References Cited

U.S. PATENT DOCUMENTS

| | | | |
|---|---|---|---|
| 1,437,257 | 11/1922 | Mattice | 219/146.1 |
| 1,794,983 | 3/1931 | Ritter | 219/145.1 |
| 2,024,992 | 12/1935 | Wissler et al. | 219/146.1 |
| 2,520,112 | 8/1950 | Bourque et al. | 219/145.23 |
| 4,349,721 | 9/1982 | Mentink et al. | 219/145.23 |
| 4,426,428 | 1/1984 | Kammer et al. | 219/145.23 |

FOREIGN PATENT DOCUMENTS

| | | | |
|---|---|---|---|
| 7026495 | 11/1973 | Japan | 219/145.23 |
| 1040351 | 4/1974 | Japan | 219/145.23 |
| 2065144 | 11/1975 | Japan | 219/145.23 |

Primary Examiner—E. A. Goldberg
Assistant Examiner—Lincoln Donovan
Attorney, Agent, or Firm—Bertram F. Claeboe

[57] ABSTRACT

A cluster welding electrode assembly is provided which permits the deposition of maximum weights of weld metal with minimum amperage and voltage values. The assembly is comprised of a central rod electrode having circumferentially grouped or nested thereabout in longitudinally aligned relationship a plurality of lesser diameter rod electrodes. Each of the rods in the assembly carries thereon a novel flux coating productive during the welding operation of a nickel-chromium-molybdenum type alloy characterized as dense, porous-free and homogenous. Various means are disclosed for integrating the central rod electrode and surrounding lesser diameter rod electrodes into a unitary welding assembly.

4 Claims, 3 Drawing Figures

ARC WELDING ELECTRODE

BACKGROUND OF THE INVENTION

In the art of welding there exists a substantial requirement for the economical deposition of substantial quantities of solid weld metal. Exemplary applications are the repair of worn-out areas on a work-piece, engineering changes on a particular part, providing complete impressions which may involve flooding an impression full on a forging die that is to be machined, and correcting machining errors. Relatively large electrodes, which provide a fast deposit, are generally utilized for the applications named, and illustrative of the parts upon which this technique may be practiced are forge dies, press dies, trim dies, hammer bases, rams, sow blocks, columns and tie plates, and any relatively heavy industrial equipment requiring repair.

In the broad area of high deposition die welding it is known to employ electrodes of the nickel-chromium-molydenum alloy type having a diameter of the order of ¾ inch (19.1 mm) and suitably flux coated. Electrodes of this character in commercial practice produce dense, porous-free homogenous weld deposits at a rate of approximately 60 pounds per hour utilizing about 2100 amperes. It is readily apparent that deposition rates of this magnitude represent a substantial advance in the art of shielded metal-arc welding. However, present day cost considerations demonstrate the need to deposit greater weights of high quality weld metal at a lesser value of arc time per hour.

SUMMARY OF THE INVENTION

It has been discovered by applicant that this need is substantially entirely met by provision of a cluster electrode-formed of a central rod and individual rods circumferentially nested thereabout, each rod in the bundle comprising the cluster electrode of the instant invention being exteriorly coated with a novel flux composition and achieving thereby the deposition of maximum weights of liquid weld metal utilizing minimum current and voltage values. The solidified weld metal produced in this manner has been found to exhibit enhanced physical properties.

The flux composition of this invention features the inclusion therein of defined quantities of calcium carbonate ($CaCO_3$) and calcium fluoride ($CaF_2$). Additional metals or minerals present in applicant's flux coating composition in particular amounts are manganese, silicon, iron, chromium, and silicates. Even further, specific applications may indicate the desirability of incorporating in the formulation just noted defined ranges of molybdenum, tungsten, nickel, vanadium and titanium.

The structural details of the novel cluster electrode of this invention and an exemplary method of fabrication thereof will be dealt with as the description proceeds. The composition of the welding rods, exemplary diameters and lengths, and illustrative coating thicknesses will also be specifically set forth hereinafter.

DESCRIPTION OF THE PREFERRED EMBODIMENT

An assemblage of welding electrodes comprised of a plurality of lesser diameter electrodes grouped or nested about a central larger diameter electrode is known in the prior art, and a typical construction is that shown in U.S. Pat. No. 2,520,112 issued Aug. 29, 1950 in the names Philip Bourque and Matt Kiilunen. While the structures shown and and described in this patent, and which are directed primarily to the utilization of a hollow or tubular central member, represented a significant advance in the art at that time, in subsequent years as welding technology has advanced, there has been increasing emphasis on effecting substantial production economies. It has been noted hereinabove that definite progress has been made in this direction by the development and commercial availability of relatively large diameter rod electrodes of the order of three quarters of an inch (19.1 mm) constructed of a nickel-chromium-molybdenum alloy and provided with a high energy flux coating thereon. Quite significantly, dense porous-free homogenous weld deposits are produced in commercial practice with this type electrode at rates of at least 60 pounds per hour utilizing approximately 2100 amperes. By the present invention, however, it has been found possible to surpass these accomplishments.

Figure 1:
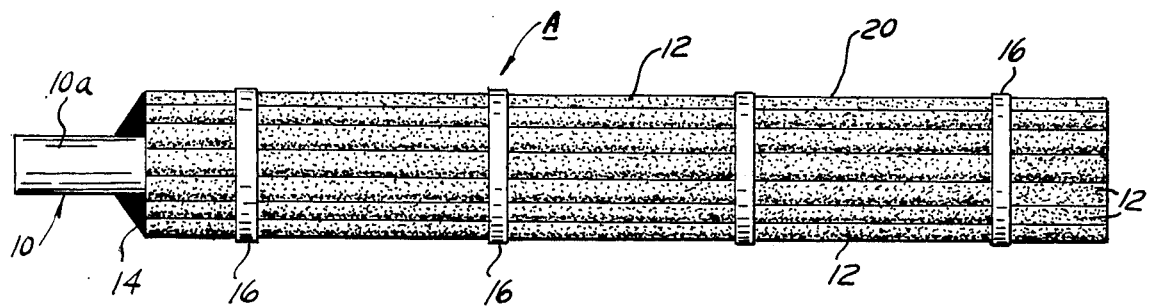
FIG. 1 is a side elevational view of a cluster welding electrode constructed in accordance with the novel concepts of this invention.
Figure 2:
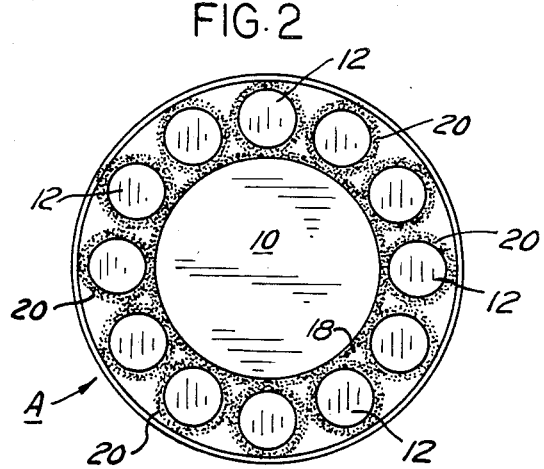
FIG. 2 is an end view of the instant electrode.

A preferred structural embodiment of the invention is shown in FIGS. 1 and 2 of the drawings, and reference is now made thereto. A cluster electrode assembly for use in a shielded metal-arc welding process is designated generally therein by the legend A and comprises a relatively large diameter central rod electrode 10 about which is grouped or nested in circumferentially surrounding relation a plurality of lesser diameter rod electrodes 12. As appears in FIG. 1, the central electrode 10 is of relatively greater length than the smaller electrode 12, and in this manner there is provided a terminal 10a which is gripped by the electrode holder in the welding operation. The terminal portion 10a of the central electrode 10 is bare, or in other words carries no flux coating thereon, and the same is the case with opposed ends of the smaller electrodes 12. A generally circular dome-shaped weldment 14 provides a current flow path from the central electrode terminal 10a through the smaller electrodes 12 during the welding operation.

In addition to being a current conduit from the terminal 10a to the outer electrodes 12, the weldment 14 functions to secure the smaller electrodes to the central electrode 10, providing thereby an integrated cluster electrode assembly A. Additional securement means for the assembly A are preferably provided, and this may take the form of circumferentially embracing strap or band means 16 of a material consumable during the welding operation. Alternatively or additionally the securement means may be provided by a cap or like device (not shown) at the flat or bottom end of the cluster electrode assembly A, that is, at the end opposite the terminal portion 10a.

The particular intended application for the assembly A will of course dictate variations in lengths, diameters and compositions of the electrodes 10 and 12, as well as the specific number of smaller or slender electrodes 12 employed. The electrodes 10 and 12 are constituted of a mild or low carbon steel, generally about 0.04 to 0.12 carbon depending upon the type of core electrode 10, and this type steel is designated in the trade as C-1004 to C-1012, although other grades may upon occasion be found suitable. The relatively larger diameter central rod electrode 10 may illustratively have a length of about 48 inches and an approximate diameter of 0.8137 inches. The relatively smaller diameter rod electrodes 12, on the other hand, are generally of a length of up to approximately 47 inches and a diameter of about 0.250 inches. As noted, substantial variations in the composition of the rods and the dimensions thereof may be affected as the particular welding application may require.

The central rod 10 carries thereon a flux coating 18 and the outer circumferentially surrounding rods 12 a flux coating 20. The coatings 18 and 20 are preferably applied to the bare mild or low carbon steel rods by conventional extrusion techniques, and accordingly, opposed ends of the rods 10 and 12 are void of flux composition for current flow reasons. And further as to the central electrode 10, the terminal portion 10a thereof is of course free of flux coating 18 for the same reasons.

It is known in the welding art that electrode flux coatings have at least three important functions. First, they promote electrical conductivity across the arc column by ionization of the developed gases. Second, they produce a shielding gas (basically $CO_2$) that excludes the atmosphere from the weld puddle. Third, such coatings add slag-forming materials to the molten weld puddle for grain refinement and, in some cases, for alloy addition to the weld. Each of these known functions or actions of electrode flux coatings are substantially enhanced by the flux composition of this invention, particularly as applied to applicant's novel cluster electrode.

Broadly stated, the instant flux composition comprises the following metals or minerals in the ranges noted:

| INGREDIENT | FROM ABOUT % TO ABOUT % WEIGHT |
| --- | --- |
| Manganese | 2 to 12 |
| Silicon | 2 to 10 |
| Iron | 5 to 35 |
| $CaCO_3$ | 20 to 60 |
| $CaF_2$ | 8 to 35 |
| Chromium | 3 to 12 |
| Silicate | 5 to 15 |
| Molybdenum | 0 to 10 |
| Tungsten | 0 to 10 |
| Nickel | 0 to 15 |
| Titanium | 0 to 15 |
| Vanadium | 0 to 3. |

Experience has demonstrated that in the foregoing formulation calcium carbonate releases a high percentage of carbon dioxide gas which acts as a shield and also burns off sulfur in oxide form. As is known, the presence of sulfur during welding tends to produce porosity and embrittlement in the solidified weld metal. Calcium fluoride functions in the composition as a cleansing agent and arc stabilizer. Calcium carbonate and calcium fluoride act importantly as slag formers, as well as being arc stabilizers and cleansing agents, and in combination, give proper burn-off or melting rate and good cleaning of the metal. Absent these two compounds, it is to be anticipated that in the system described herein, it would be essentially impossible to produce a high quality weld metal. Absence of a smooth metal flow or the presence of metal spillover is also to be expected.

In the composition above tabulated, a wide variety of sources for the metals or minerals listed may be utilized. To illustrate, the manganese may be in the form of the powdered metal or as ferromanganese which is an alloy consisting of manganese plus iron and carbon. Silicon may be as an alloy such as ferrosilicon or ferrochrome silicon, and the iron may be provided from the core rod shown at 10 in the drawings herein or separately added in powdered form or in alloy form as ferrochrome, ferrosilicon or ferromanganese. Calcium carbonate of course occurs in natural form as calcite and is obtainable as a white powder, and the same is the case with respect to calcium fluoride which occurs in nature as fluorspar and generally is used as a white powder. Chromium in applicant's formulation may be provided by the metal powder or as ferrochrome, an alloy principally of iron and chromium and available with either a high or low carbon content. The silicate can take the form of natural mica as a powder, or may be as sodium or potassium silicate in liquid or powder form.

As earlier stated, the instant flux composition may or may not have present therein molybdenum, tungsten, nickel, vanadium or titanium. When employed, the molybdenum may be in metal powder form or as a ferromolybdenum alloy. Because of its relatively high melting point, tungsten in metal form is not indicated for use in the present compound, and instead the ferrotungsten alloy is preferred. Nickel is used in metal form as a powder, while titanium, if employed, can be either in powdered metal form or as ferrotitanium alloy. Vanadium is available in powdered metal form, and if utilized in the present formulation, would be in this state.

Figure 3:
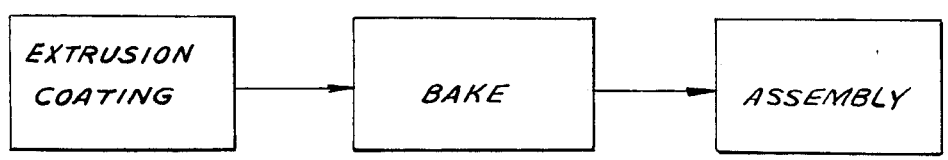
FIG. 3 is a block flow diagram showing an illustrative sequence of steps in formation of applicant's cluster electrode assembly.

The steps which may be employed in the production of the cluster electrode assembly A of this invention are portrayed in the flow diagram of FIG. 3, and reference is now made thereto. The preferred manufacturing technique is to extrusion coat and bake rods of relatively large diameters in operations independent of those practiced with rods of lesser diameters, since among other variables, different amounts of slag formers are utilized for the central rod than for the smaller diameter surrounding rods, as will be noted in further detail hereinafter. However, with both diameter rods a bare mild steel rod of predetermined length and diameter is caused to travel through a conventional extrusion coater at a rate approximately 50 feet per minute and the desired amount of flux coating is applied thereto. Illustratively, a rod having a diameter of about 0.8137 inches preferably carries a coating of approximately 0.0463 inches, while a rod with an approximate diameter of 0.250 inches desirably is provided with a coating of about 0.150.

The next step is baking to cure and set the coating, and a conventional oven may be utilized. Generally stated, a bake time of 3 to 6 hours is preferred at a temperature not to exceed 750° F. The coated and baked rods, after having been allowed to cool, are assembled with the lesser diameter rods 12 in nestable surrounding relation to the central rod 10. While temporarily restrained in this position by any desired means, the rod assembly is welded as at 14 and circumferential straps or bands 16 applied thereto as shown in FIG. 1. Other retention means may of course be utilized, and as was earlier noted, cap means or the like (not shown) may be employed at the bundle end opposite the terminal 10a.

In the illustrative embodiment of the invention shown in the drawings twelve (12) smaller electrodes 12 are grouped about the central electrode 10. This number may of course vary for particular applications.

The novel aspects of the present invention will be more fully appreciated when reference is made to the Example now to follow. A cluster welding electrode assembly having the structural features shown in FIGS. 1 and 2 of the drawings was produced by the general process of FIG. 3. The flux coating provided on the cluster electrode A had substantially the following composition:

EXAMPLE

| INGREDIENT | APPROXIMATE PARTS BY WEIGHT |
| --- | --- |
| Manganese | 6 |
| Silicone | 8 |
| Iron | 10 |
| CaCO₃ | 50 |
| CaF₂ | 20 |
| Chromium | 12 |
| Silicate | 4 |
| Molybdenum | 6 |
| Nickel | 8 |

The central rod 10 and surrounding rods 12 were of mild steel and had the approximate lengths, diameters and coating thicknesses earlier disclosed. In the welding operation the voltage was controlled between about 26 and 30 volts and the current between approximately 1800 and 2400 amperes. It was noted that substantially in excess of 90 pounds of solid weld metal was deposited per hour, and that the weld metal upon solidification was dense, porous-free and homogenous. The nickel-chromium-molybdenum alloy products had a hardness of Rockwell C20-45, a tensile strength from around 80,000 to 200,000 psi, and elongation of up to 25%, and excellent machinability.

It was noted hereinabove that flux coatings have at least three important functions on shielded arc electrodes. The functions to which reference was made dealt principally with chemical protection. In the area of mechanical protection, the coating insulates the sides of the electrode so that the arc is concentrated at the end of the electrode into a confined area. This is important and will facilitate welding in a deep "U" or "V" groove. Additionally, the coating is effective to produce a cup, cone or sheath at the tip of the electrode, which acts much like a crucible, providing a mechanical shield, concentrating and directing the arc, reducing the thermal losses, and increasing the temperature on the end of the electrode.

While applicant does not wish to be bound by one particular theory, it would appear that in the cluster welding electrode assembly of this invention the smaller diameter or outer electrodes 12 in combination with the central electrode or core 10 provide individual arcs which transfer heat into the central core, thereby facilitating molten metal flow and avoiding excess metal in the cup, which would tend to produce a large amount of globular transfer. By the instant invention, there is effected a breakup of the globules of molten metal leaving the ends of the electrodes in fine particles, by reducing the adhesive force between the molten metal and the ends of the electrodes, or by changing the surface tension of the molten metal.

It can be seen from the foregoing that applicant has provided a cluster welding electrode assembly which permits the deposition of maximum weights of liquid weld metal utilizing minimum current and voltage values and which produces solidified weld metal having enhanced physical properties. These desirable results are achieved by the instant cluster electrode provided with a flux coating thereon the constituents of which are subject to relatively wide variations within the ranges set forth hereinabove. These and other modifications to the composition and structure herein disclosed may of course be effected without departing from the spirit of the invention or the scope of the subjoined claims.

I claim:

1. An arc welding electrode, comprising a solid central low carbon steel rod electrode, a plurality of solid lesser diameter low carbon steel rod electrodes circumferentially grouped about said central electrode and longitudinally aligned therewith, means maintaining the central rod electrode and lesser diameter rod electrodes in a cluster relationship, and a tightly adherent flux coating on each of said rod electrodes and having a composition which produces during a welding operation a weld deposit of niobium-free nickel-chromium-molybdenum type allow characterized as dense, porous-free and homogenous, said flux coating having substantially the following composition:

| INGREDIENT | FROM ABOUT % TO ABOUT % BY WEIGHT |
| --- | --- |
| Manganese | 2 to 12 |
| Silicon | 2 to 10 |
| Iron | 5 to 35 |
| CaCO₃ | 20 to 60 |
| CaF₂ | 8 to 35 |
| Chromium | 3 to 12 |
| Silicate | 5 to 15 |
| Molybdenum | 0 to 10 |
| Tungsten | 0 to 10 |
| Nickel | 0 to 15 |
| Titanium | 0 to 15 |
| Vanadium | 0 to 3. |

2. An arc welding electrode of the character defined in claim 1, in which the central rod electrode is of relatively greater length than the lesser diameter electrodes so as to axially extend therebeyond at one end, and in which there is provided a weldment at said one end securing the electrodes one to the other and also providing a current flow path therebetween.

3. A cluster welding electrode assembly, comprising a solid central core rod member of low carbon steel having a flux coating thereon terminating axially inwardly of one end thereof to provide an electrical terminal at said one end, a plurality of solid flux coated relatively lesser diameter electrode rod members of low carbon steel circumferentially embracing said core rod member and being of axial lengths substantially equal to the axial length of the flux coated portion of said core member, and means joining the lesser diameter rod members to said core rod member in fixed surrounding relation thereto, the flux coating on said core rod member and on said lesser diameter rod members having substantially the following composition:

| INGREDIENT | FROM ABOUT % TO ABOUT % BY WEIGHT |
| --- | --- |
| Manganese | 2 to 12 |
| Silicon | 2 to 10 |

-continued

| INGREDIENT | FROM ABOUT % TO ABOUT % BY WEIGHT |
|---|---|
| Iron | 5 to 35 |
| CaCo3 | 20 to 60 |
| CaF2 | 8 to 35 |
| Chromium | 3 to 12 |
| Tungsten | 0 to 10 |
| Nickel | 0 to 15 |

-continued

| INGREDIENT | FROM ABOUT % TO ABOUT % BY WEIGHT |
|---|---|
| Titanium | 0 to 15 |
| Vanadium | 0 to 3. |

4. A cluster welding electrode assembly as defined in claim 3, in which the joining means is a weldment abutting one end of the lesser diameter electrode rod members and circumferentially surrounding a portion of the electrical terminal of the core rod member to establish a current flow path through each of the rod members.

* * * * *